(12) United States Patent
Kutsch et al.

(10) Patent No.: US 8,011,530 B2
(45) Date of Patent: Sep. 6, 2011

(54) ARTICULATING HANDLE FOR SPACE-SAVING COOKWARE AND METHOD FOR USING SAME

(75) Inventors: Duane B. Kutsch, Richland, WA (US); Daniel Altheimer, Marshall, NC (US); Kenneth R. Morris, Cornelius, NC (US); Christopher Keidl, Hartland, WI (US)

(73) Assignees: SEB S.A. (FR); Groupe SEB USA, West Orange, NJ (US)

( * ) Notice: Subject to any disclaimer, the term of this patent is extended or adjusted under 35 U.S.C. 154(b) by 606 days.

(21) Appl. No.: 11/715,170

(22) Filed: Mar. 7, 2007
(Under 37 CFR 1.47)

(65) Prior Publication Data

US 2008/0179211 A1    Jul. 31, 2008

Related U.S. Application Data

(60) Provisional application No. 60/781,453, filed on Mar. 10, 2006.

(51) Int. Cl.
*B65D 25/28* (2006.01)
*A47J 36/00* (2006.01)
*B65D 25/22* (2006.01)

(52) U.S. Cl. .................... 220/762; 16/110.1; 220/573.1; 220/763

(58) Field of Classification Search .................. 220/762, 220/573.1, 764, 766, 763; 16/440, 431, 110.1, 16/333, 349, 324, 409
See application file for complete search history.

(56) References Cited

U.S. PATENT DOCUMENTS

| | | | | |
|---|---|---|---|---|
| 582,076 A * | 5/1897 | Morris | .......................... | 220/763 |
| 1,077,946 A * | 11/1913 | Walk | .............................. | 220/263 |
| 1,181,806 A * | 5/1916 | Smithers | ....................... | 210/244 |
| 1,348,813 A * | 8/1920 | Landine | .......................... | 16/324 |
| 1,479,628 A * | 1/1924 | Seger | .............................. | 182/24 |
| 2,299,584 A * | 10/1942 | Low | ................................. | 182/24 |
| 2,403,191 A * | 7/1946 | Phillips | ......................... | 220/756 |
| 2,881,945 A * | 4/1959 | Rappaport | .................... | 248/688 |
| 2,915,001 A * | 12/1959 | Montgomery | ................. | 99/339 |
| 3,812,997 A * | 5/1974 | McNally | ....................... | 220/529 |
| 4,222,493 A * | 9/1980 | Friedman | ......................... | 220/8 |
| 4,724,576 A * | 2/1988 | Tatematsu | ..................... | 220/763 |
| 5,660,300 A * | 8/1997 | Demetrio | ...................... | 220/763 |
| 6,079,590 A * | 6/2000 | Munari | ......................... | 220/762 |
| 6,220,477 B1 * | 4/2001 | Schneider | ..................... | 220/763 |
| 6,526,876 B2 * | 3/2003 | Kahler et al. | .................. | 99/394 |
| 7,090,094 B2 * | 8/2006 | Wade et al. | ..................... | 220/764 |
| 2005/0167435 A1 * | 8/2005 | Whitmer | .................... | 220/573.1 |

* cited by examiner

*Primary Examiner* — Mickey Yu
*Assistant Examiner* — Niki Eloshway
(74) *Attorney, Agent, or Firm* — The Webb Law Firm

(57) ABSTRACT

An articulating handle for an item of cookware is provided. The articulating handle is configured for connection with the cookware through a hinge assembly. The handle may be locked into substantially horizontal position such as for use of the cookware, or a substantially vertical position for storage. As such, cookware including such a handle can be stacked in a space-saving manner. A method for stacking cookware and a stack of cookware incorporating such a handle are also provided.

12 Claims, 9 Drawing Sheets

US 8,011,530 B2

ARTICULATING HANDLE FOR SPACE-SAVING COOKWARE AND METHOD FOR USING SAME

CROSS REFERENCE TO RELATED APPLICATION

This application claims the benefit of Provisional Application No. 60/781,453 filed Mar. 10, 2006, entitled "An Articulating Handle for Space-Saving Cookware and Methods for Doing the Same", which is incorporated in its entirety by reference herein.

BACKGROUND OF THE INVENTION

1. Field of the Invention

The present invention generally relates to an articulating handle for space-saving cookware and, more particularly, to an articulated handle for cookware that is configured to save space by rotating between and locking into multiple positions, and methods for using the same.

2. Description of Related Art

Consumers have been frustrated for many years by the inability to neatly and efficiently store cookware, e.g., a variety of sizes of pans, pots, etc., in cabinets, particularly a variety of sized pieces of cookware. Conventional cookware generally includes a handle that is fixed to a side of the cookware and protrudes outwardly from the side. This protruding handle generally occupies shelf space within the cabinet, preventing another piece of cookware from being positioned in a side-to-side manner adjacent the first piece of cookware. Such a conventional handle design creates wasted space within the cabinet.

Moreover, although conventional cookware pieces may nest within one another, there has always been a problem with conventional cookware nesting in a level stacked arrangement due to the attached handles. Inevitably, the end result of any effort to nest cookware pieces (e.g., pans with handles) for storage is an unstable, un-level arrangement that does not make the best use of available storage space due to the acute angle of the nested cookware. This acute angle is caused by the handle of an inner, smaller piece of cookware resting on a sidewall of an outer, larger piece of cookware.

Generally, cookware designed to address this problem includes either collapsible or removable handles. However, these types of handles create separate problems of their own, such as adding complexity to the cookware's design and manufacture as well as demands on the consumer. In addition, the removable handles also require the consumers to remove and store the handles separately, which adds the potential risk of the consumer misplacing the handles. Thus, there is still a need for an improved handle for cookware.

SUMMARY OF THE INVENTION

The present invention solves the problems heretofore encountered in the prior art by providing an articulated handle for cookware wherein the cookware may be nested in a level arrangement, thus saving storage space. The articulated handle of the present invention does not require removal of the handle prior to storing the cookware due to the inventive handle assembly which permits locking and unlocking the handle assembly for vertical positioning the handle when storing.

BRIEF DESCRIPTION OF THE DRAWINGS

While the specification concludes with claims particularly pointing out and distinctly claiming the invention, embodiments of the invention will be better understood from the following description taken in conjunction with the accompanying drawings in which:

Figure 1:
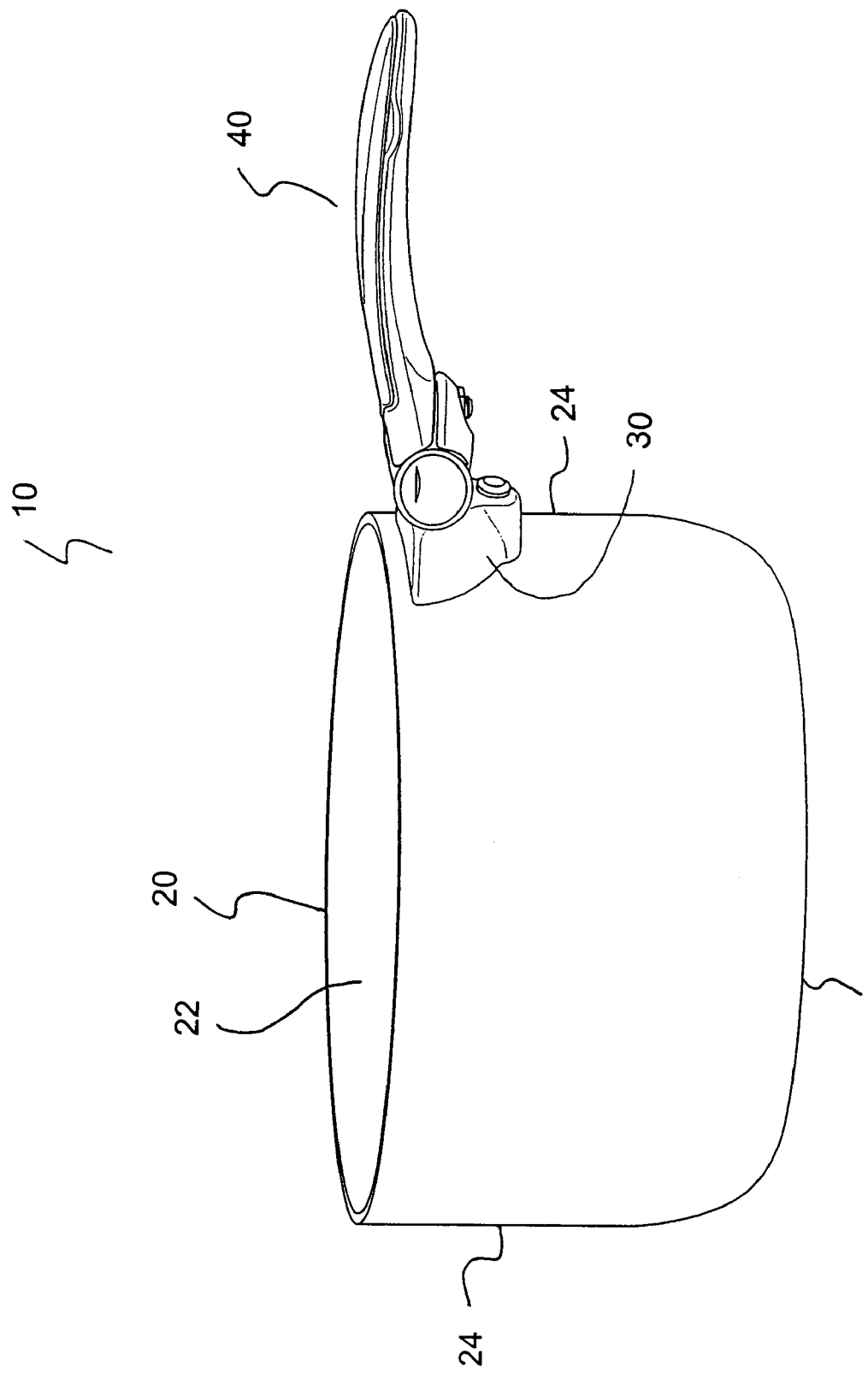
FIG. 1 is a perspective view of an exemplary embodiment of an articulating handle for cookware according to the present invention.

The embodiments set forth in the drawings are illustrative in nature and not intended to be limiting of the invention which is defined by the claims. Moreover, individual features illustrated in the drawings will be more fully apparent and understood with reference to the following detailed description.

DETAILED DESCRIPTION OF THE INVENTION

Reference will now be made in detail to various embodiments of the invention, examples of which are illustrated in the accompanying drawings, wherein like numerals indicate similar elements throughout the views.

FIGS. 1-6 disclose an exemplary embodiment of a space-saving cookware 10 according to the present invention. Such an embodiment saves space within storage cabinets and permits multiple cookware pieces to be neatly stacked and stored within the cabinets. The exemplary cookware 10 includes a receptacle 20 and an articulating handle assembly 40. Receptacle 20 may include a sidewall 24, bottom wall 26, a reservoir 22 formed by sidewall 24 and bottom wall 26, and a hinge assembly receiving device 28 connected to the sidewall. Hinge assembly receiving device 28 may be connected to sidewall 24 by any conventional device or method known to one of ordinary skill in the art, including but not limited to a rivet, screw, bolt, welding, brazing, etc. It is understood that receptacle 20 may comprise, but is not limited to, pots, pans, boilers, woks, griddles or any other cookware as known to one of ordinary skill in the art. In addition, receptacle 20 may be fabricated from any conventional materials used in cookware such as metals, metals coated with non-stick material and/or other materials as known to one of ordinary skill in the art.

Figure 2:
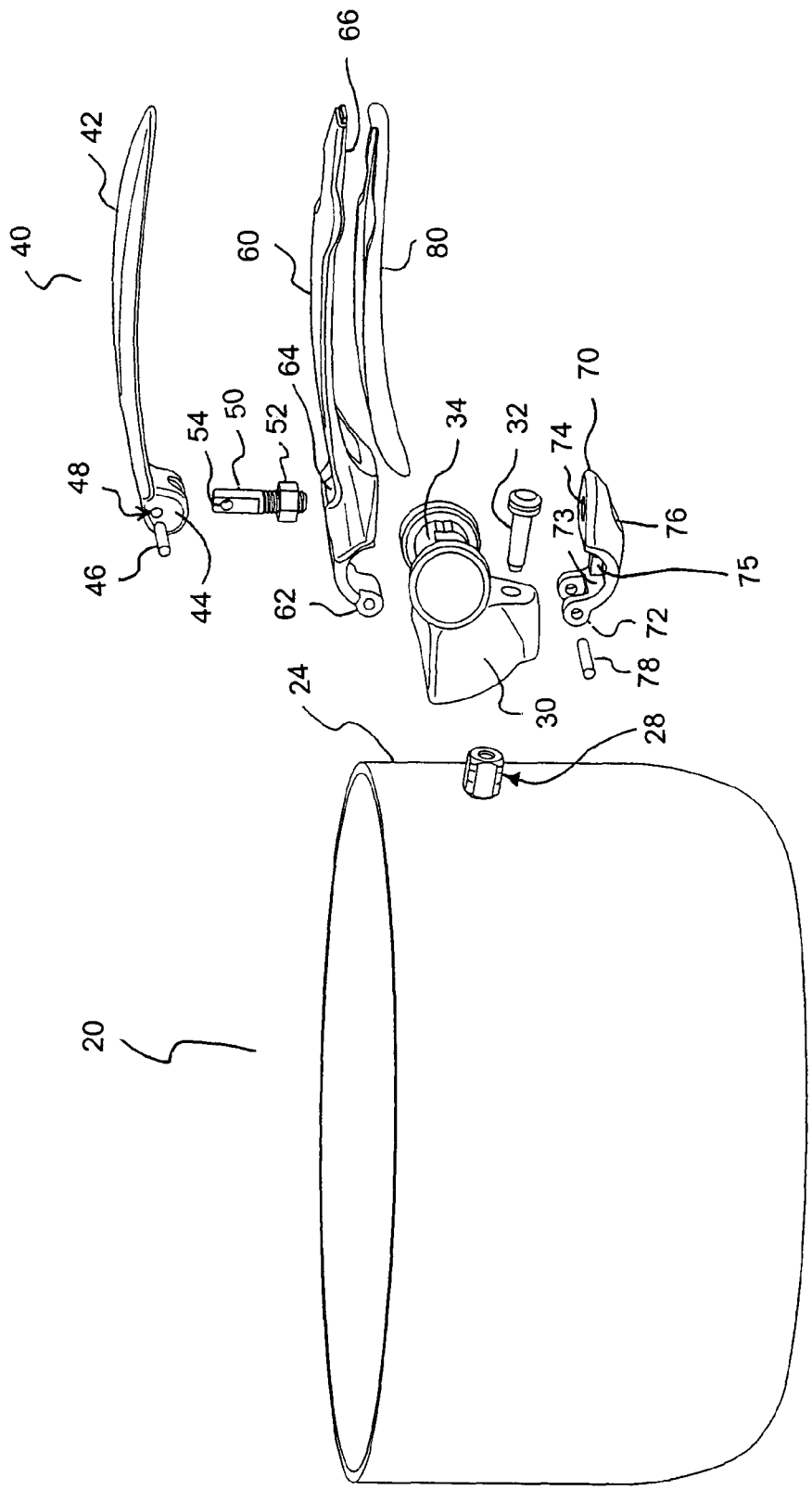
FIG. 2 is an exploded perspective view of the handle illustrated in FIG. 1.

As shown in FIG. 2, cookware 10 may include a hinge assembly 30 that is connected to sidewall 24 of receptacle 20 using a fastener 32 that connects hinge assembly 30 to hinge assembly receiving device 28. It is understood that hinge assembly 30 may be connected to sidewall 24 by any conventional device or method known to one of ordinary skill in the art, including but not limited to a rivet, screw, bolt, welding, brazing, etc. In the exemplary embodiment, fastener 32 is a screw that is threadingly received into hinge assembly receiving device 28. The exemplary hinge pin shown in FIGS. 2, 5 and 6 includes two detents 36 and 38 spaced approximately 90 degrees apart from each other along the circumference of hinge pin 34, permitting handle assembly 40 to be locked into a substantially horizontal position (e.g., FIGS. 1 and 5) or a substantially vertical position (FIG. 3), respectively. It is understood that hinge pin 34 may include multiple detents in order to permit handle assembly 40 to lock into multiple positions along the hinge pin.

Figure 3:
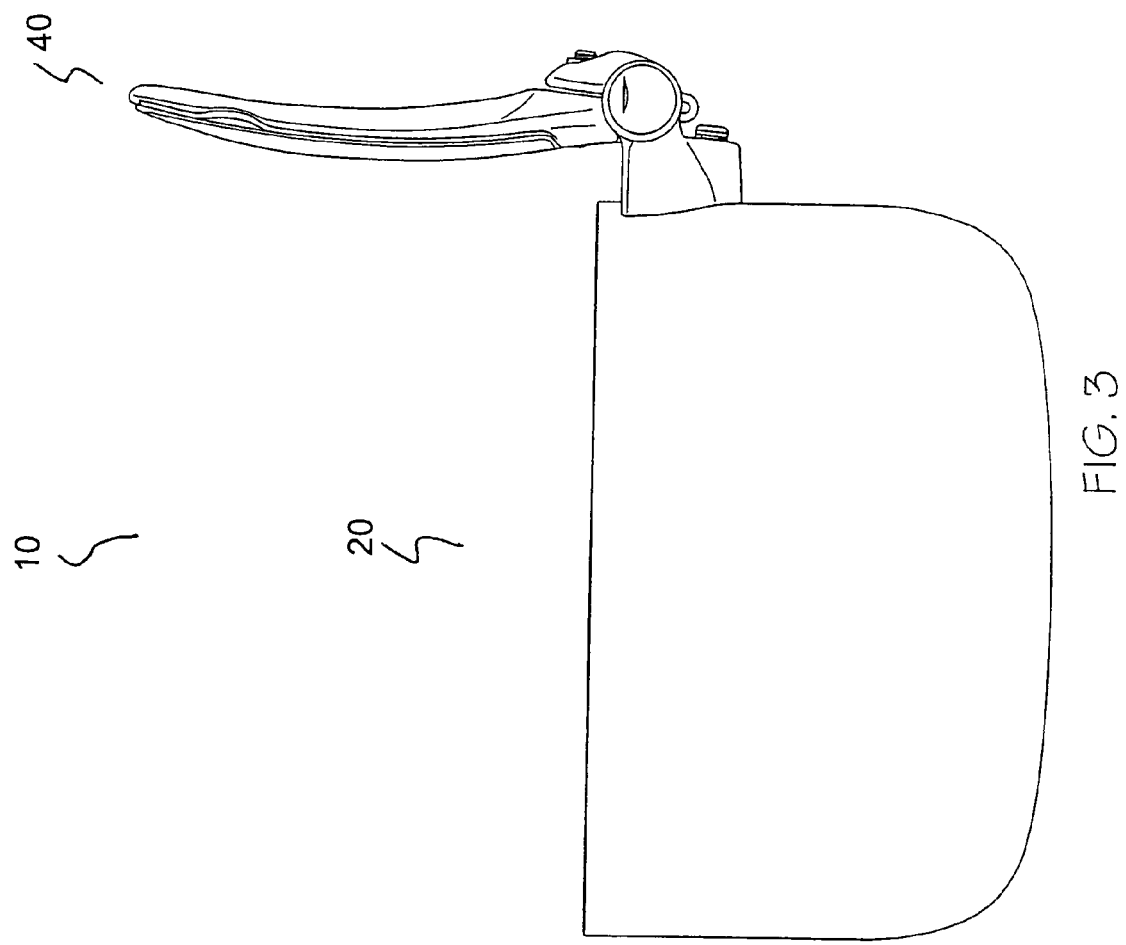
FIG. 3 is a side elevational view of the handle illustrated in FIG. 1 in a substantially vertical position.
Figure 4:
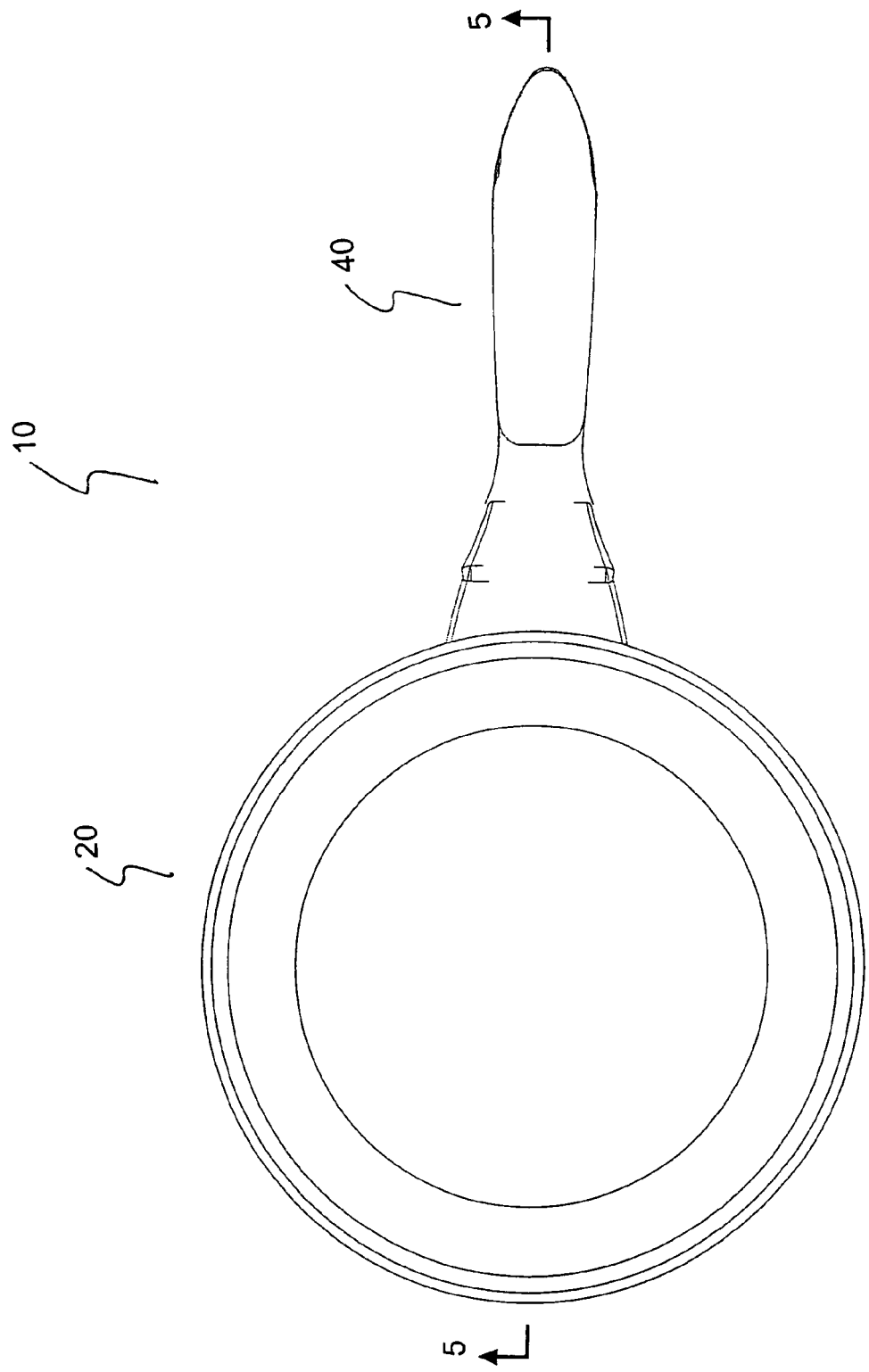
FIG. 4 is a top plan view of the handle illustrated in FIG. 1.
Figure 5:
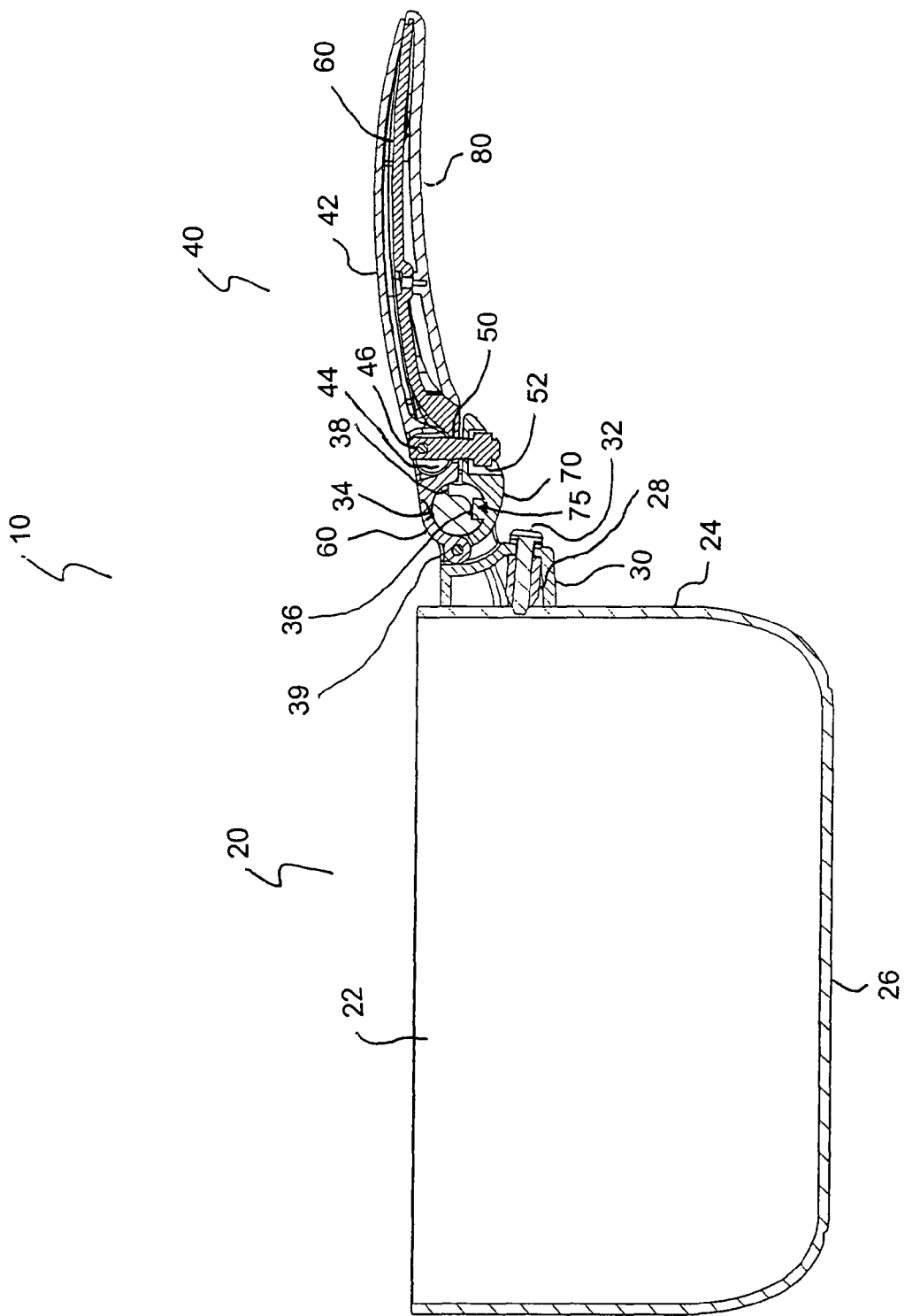
FIG. 5 is a cross-sectional view of the handle illustrated in FIG. 4.

Handle assembly 40 is configured such that when connected to receptacle 20 via hinge assembly 30, it may rotate about hinge pin 34. For example, in the exemplary embodiment, handle assembly 40 rotates about hinge pin 34 between the substantially horizontal position (e.g., FIGS. 1 and 5) or the substantially vertical position (FIG. 3). Handle assembly 40 includes a locking lever 42, a locking cam 44 connected to locking lever 42, an upper clamp 60, a lower clamp 70 rotatably connected to upper clamp 60, a clamp actuator 50, and a handle grip 80 attached to an underside 66 of upper clamp 60.

Lower clamp 70 includes a first lower clamp end 72, a lower clamp hole 74, and a protrusion 75. Lower clamp 70 is formed such that a portion of its body substantially confirms to the shape of hinge pin 34 and that protrusion 75 extends inwardly from an inside surface 73 of clamp 70. Protrusion 75 is configured to engage detents 36 and 38 in order to stop and/or lock handle assembly 40 into the substantially horizontal and vertical positions, respectively.

Upper clamp 60 includes a first upper clamp end 62 and a hollow 64 disposed within upper clamp 60. At first clamp end 62, upper clamp 60 is formed to substantially conform to the shape of hinge pin 34. Upper clamp 60 and lower clamp 70 are rotatably connected to each other at upper and lower first ends 62 and 72 using clamp pin 78 such that they encompass hinge pin 34 in order to rotatably connect handle assembly 40 to receptacle 20. Clamp actuator 50, in the exemplary embodiment, includes a first actuator end 54 at one end and a head 52 at an end opposite the first actuator end. Clamp actuator 50 and head 52 may comprise a bolt and head, respectively. It is understood that other devices may be used for clamp actuator 50 and head 52 as known to one of ordinary skill in the art.

Locking lever 42 includes a hinge pin hole 48 disposed near cam 44. Locking lever 42 is rotatably connected to clamp actuator 50 and upper clamp 60 within hollow 64 using a lever hinge pin 46 that is disposed through pin hole 48 and actuator first end 54 and connects the lever to upper clamp 60. In addition, clamp actuator 50 is disposed through an aperture (not shown) in upper clamp aperture 60 within hollow 64 and through lower clamp hole 74 such that head 52 engages an outer surface 76 of lower clamp 70. As such, clamp actuator 50 causes upper clamp 60 and lower clamp 70 to substantially encompass hinge pin 34.

Figure 6:
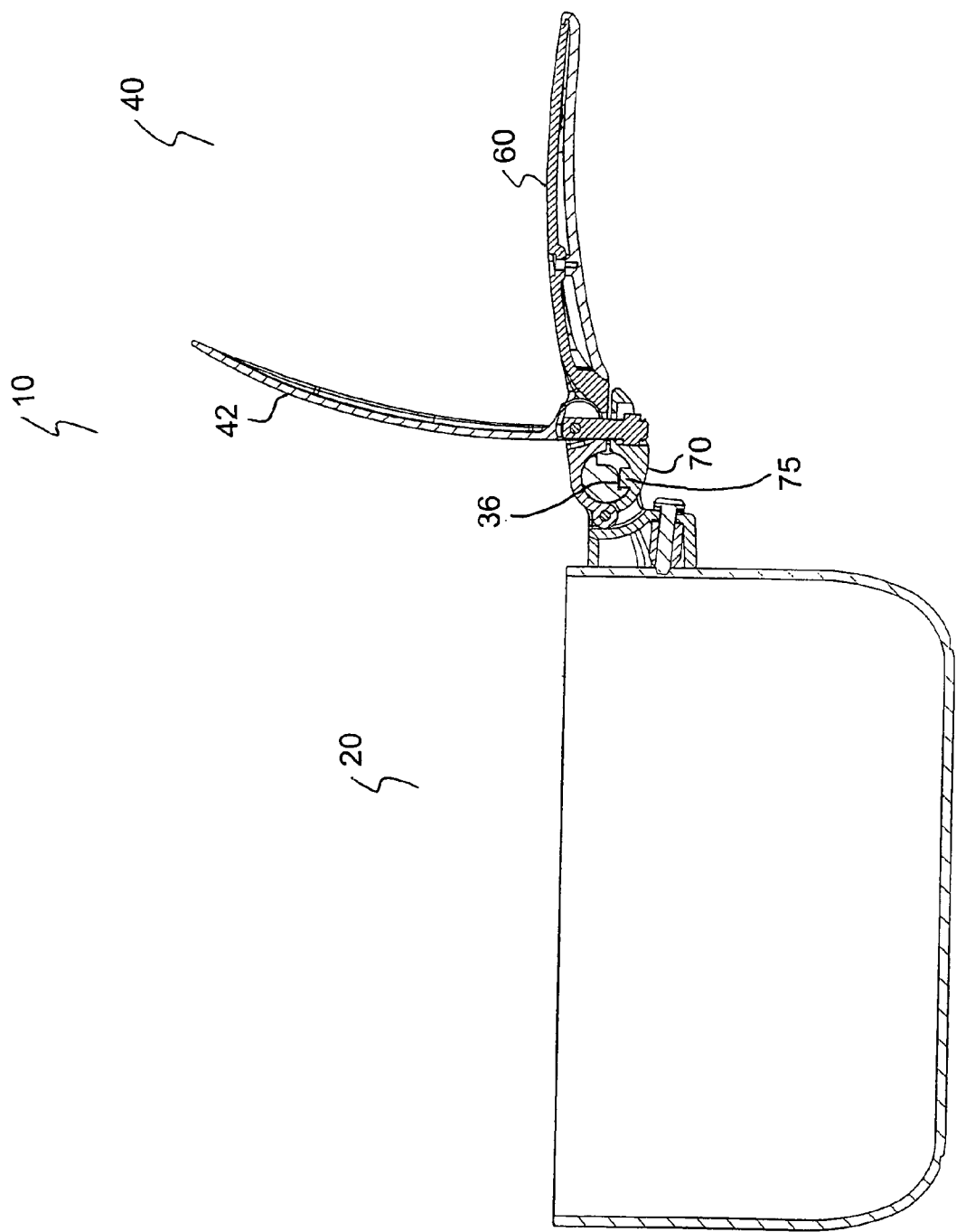
FIG. 6 is a cross-sectional view of the handle illustrated in FIG. 4, wherein the locking lever is in the unlocked position.

In operation, when lever 42 is moved to the unlock position as shown in FIG. 6, cam 44 moves actuator 50 such that head 52 disengages outer surface 76, permitting the upper and lower clamps to move apart or partially separate. When upper and lower clamps 60 and 70, respectively, move apart, protrusion 75 disengages detents 36 and/or 38, which permits handle assembly 40 to rotate about hinge pin 34. For example, if handle assembly 40 is locked in a substantially horizontal position shown in FIG. 1, lever 42 may be moved up and away from upper clamp 60 to the unlocked position, and handle assembly 40 may be rotated to the vertical position shown in FIG. 3. Once in the substantially vertical position, lever 42 may be moved back toward upper clamp 60 into the locked position, wherein the upper and lower clamps close, tighten around, and/or clamp onto hinge pin 34. This closing of upper and lower clamps 60 and 70 cause protrusion 75 to engage detent 38, locking the handle assembly in the substantially vertical position. Alternatively, the process may be repeated to cause protrusion 75 to engage detent 36, locking handle assembly 40 into the substantially horizontal position.

It is understood that hinge assembly 30, handle assembly 40 and any or all of their components may be fabricated from a variety of conventional materials, including but not limited to metals, plastics, ceramics, composite materials, any combinations thereof, or any other materials as known to one of ordinary skill in the art. In one exemplary embodiment, the upper clamp, lower clamp, and actuator are fabricated from aluminum, the locking lever is fabricated from stainless steel, and the handle grip is fabricated from plastic.

Figure 7:
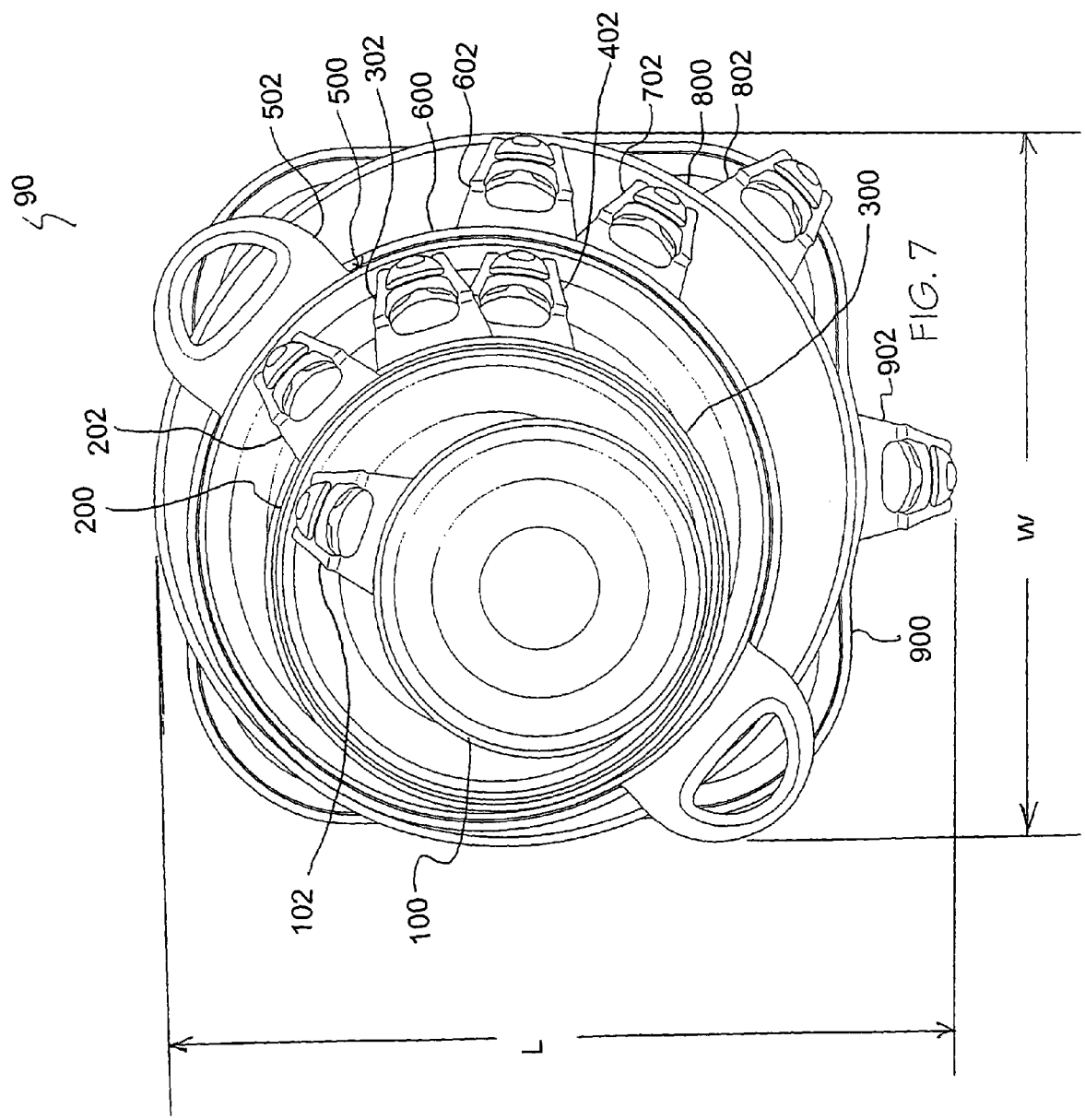
FIG. 7 is a top plan view of an exemplary embodiment of a nested arrangement of cookware pieces having articulating handles according to the present invention.
Figure 8:
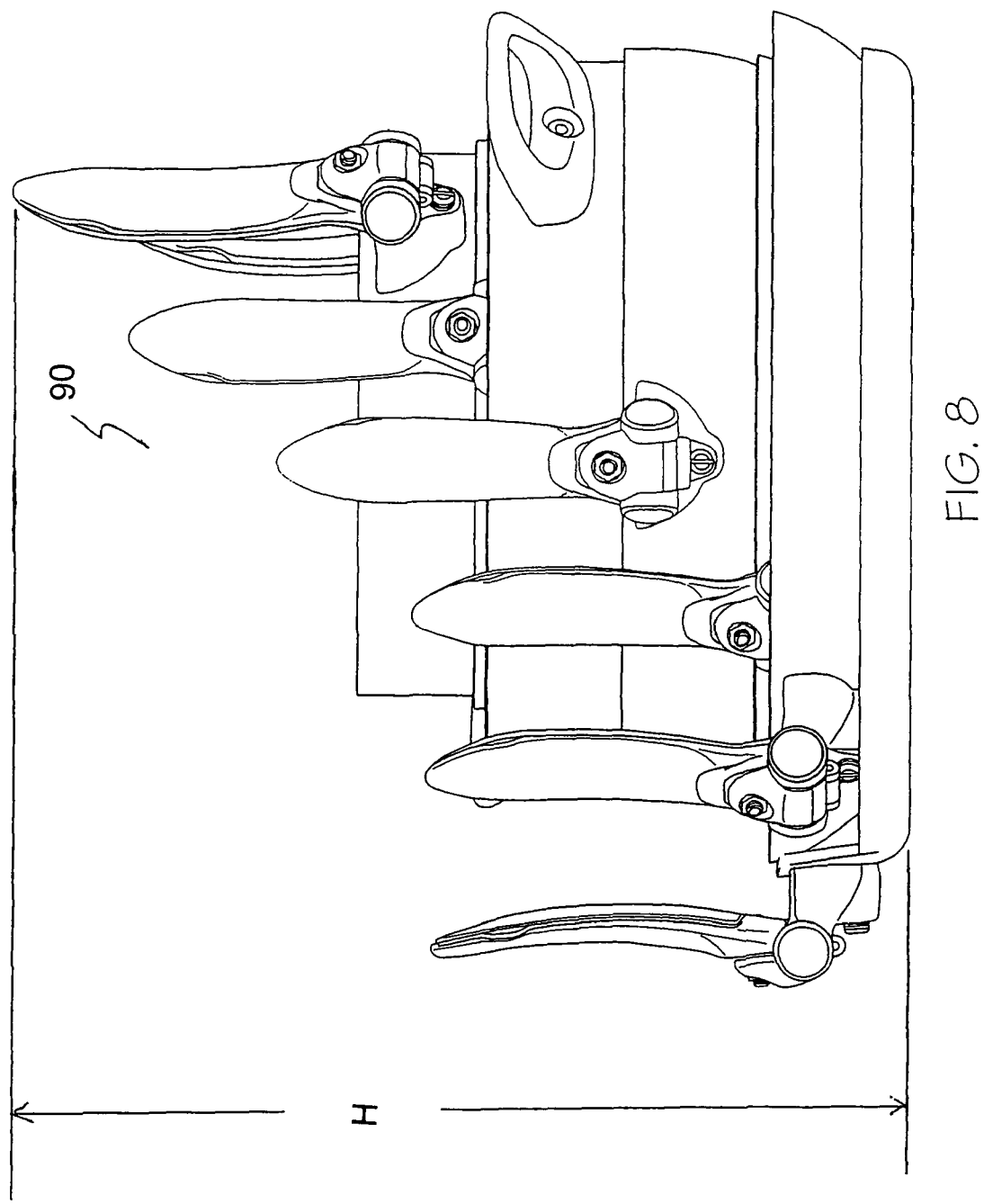
FIG. 8 is a side elevational view of the nested arrangement illustrated in FIG. 7.
Figure 9:
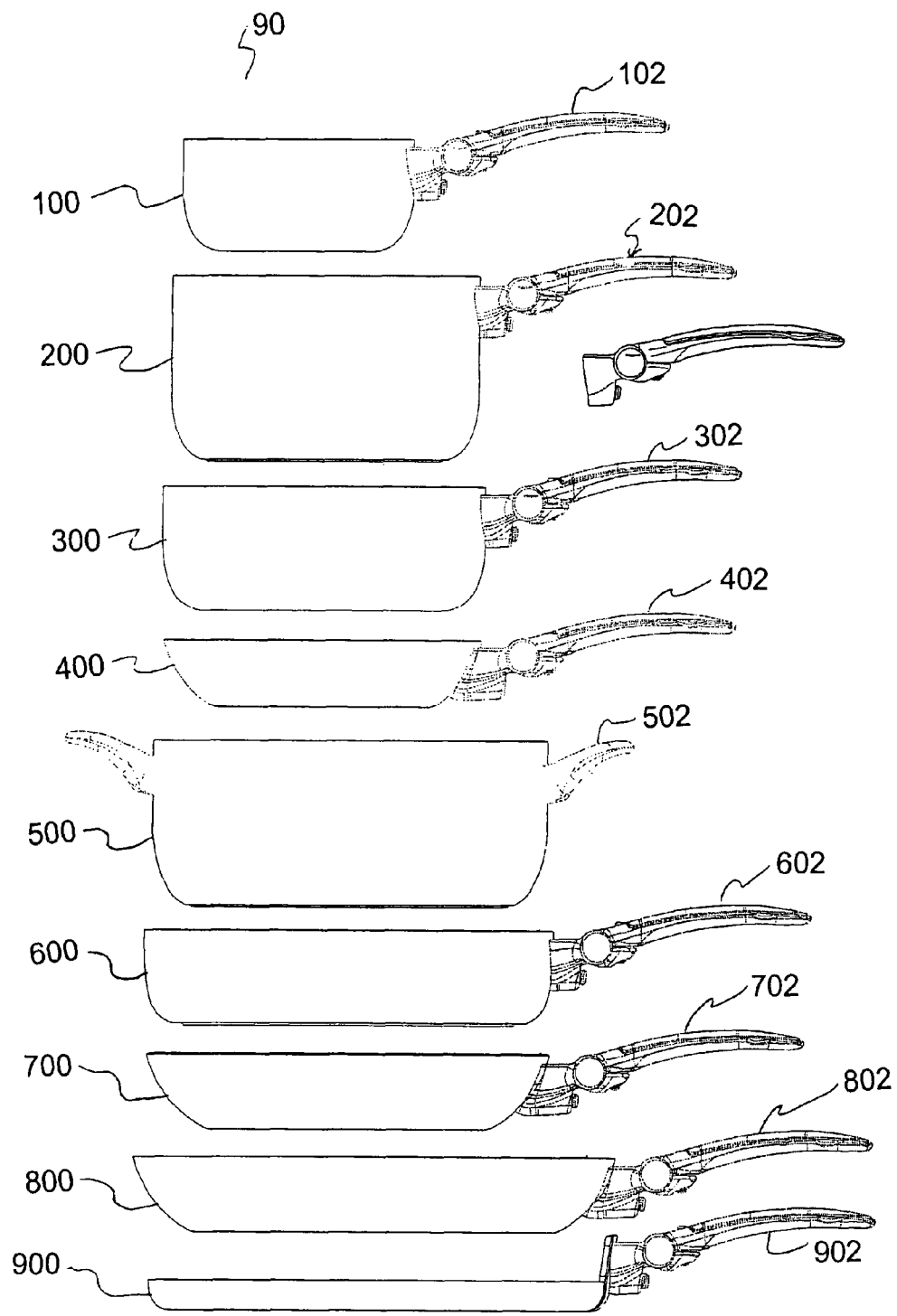
FIG. 9 is an exploded view of the nested arrangement illustrated in FIG. 7.

Referring now to FIGS. 7-9, an exemplary embodiment of a nested arrangement of stacked cookware according to the present invention is shown as 90. Nested arrangement 90 may include multiple cookware pieces having articulated handles as described herein. The exemplary embodiment includes nine (9) cookware pieces (100, 200, 300, 400, 500, 600, 700, 800 and 900), wherein the size, e.g., the diameter of the receptacle, may increase in ascending order. Thus, in the exemplary, cookware piece 100 is the smallest (e.g., smallest diameter), cookware piece 200 is slightly larger in size compared to piece 100 (e.g., larger diameter than cookware piece 100) and so on. The nested arrangement is assembled such that each correspondingly smaller cookware piece fits within and is placed within the next correspondingly larger cookware piece. For example, piece 100 is placed within the receptacle of piece 200, which is placed within the receptacle of piece 300, which is placed within the receptacle of piece 400 and so on until the nested arrangement includes all nine (9) pieces.

As set forth above, a plurality of the cookware pieces includes articulated handle assemblies (e.g., handle assemblies 102, 202, 302, 402, 502, 602, 702, 802 and 902) that when rotated to the substantially vertical position may fit within the next correspondingly larger cookware piece's receptacle as shown in FIGS. 7 and 8. Such a configuration reduces the overall height (H) of nested arrangement of cookware pieces 90 but also the length (L) and width (W). The height (H) of the exemplary is approximately 336 mm, the length (L) is approximately 360 mm, and the width is approximately 313 mm. In other words, nested arrangement 90 occupies a volume of space less than 0.04 m$^3$, in another exemplary less than or equal to 0.0379 m$^3$. The present invention saves shelf space and provides for a user to neatly stack a plurality of cookware pieces having a variety of sizes and shapes.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. An item of cookware comprising a receptacle and a handle assembly hingedly connected to the receptacle via a hinge assembly,
   wherein the handle assembly comprises a locking lever and a handle grip portion,
   wherein the locking lever is adapted to rotate independently of the handle grip portion from a substantially horizontal position, wherein the handle grip portion is locked in the substantially horizontal position, to a substantially vertical position, wherein the handle grip portion can rotate independently of the locking lever to the substantially vertical position, and wherein the handle assembly further comprises an upper clamp member and a lower clamp member, and the upper clamp member and lower clamp member rotatably engage the hinge assembly.

2. The item of cookware according to claim 1, wherein the upper clamp member has a first end, the lower clamp member has a first end, and the first end of the upper clamp member is connected to the first end of the lower clamp member.

3. The item of cookware according to claim 2, wherein the upper and lower clamp members substantially encompass a hinge pin portion of the hinge assembly.

4. The item of cookware according to claim 1, wherein the handle grip portion is attached to an underside of a lower clamp member.

5. The item of cookware according to claim 1, wherein the locking lever is rotatably connected to an actuator member.

6. The item of cookware according to claim 5, wherein the actuator member has an end which engages a clamp member.

7. The item of cookware according to claim 6, wherein movement of the locking lever from the horizontal position to the vertical position disengages the end of the actuator member from the clamp member.

8. An item of cookware comprising a receptacle and a handle assembly hingedly connected to the receptacle via a hinge assembly,
wherein the handle assembly comprises a locking lever and a handle grip portion,
wherein the locking lever is adapted to rotate independently of the handle grip portion from a substantially horizontal position, wherein the handle grip portion is locked in the substantially horizontal position to a substantially vertical position wherein the handle portion can rotate independently of the locking lever to the substantially vertical position,
wherein the handle assembly further comprises a lower clamp member, and the lower clamp member comprises a protrusion configured to engage at least one detent of the hinge assembly, and
wherein the protrusion is configured to engage a first detent of the hinge assembly when the locking lever is in the substantially horizontal position and engage a second detent of the hinge assembly when the locking lever is in the substantially vertical position.

9. An item of cookware comprising a receptacle and a handle assembly hingedly connected to the receptacle via a hinge assembly,
wherein the handle assembly comprises a locking lever and a handle grip portion,
wherein the locking lever is adapted to rotate independently of the handle grip portion from a substantially horizontal position, wherein the handle grip portion is locked in the substantially horizontal position, to a substantially vertical position, wherein the handle grip portion can rotate independently of the locking lever to the substantially vertical position,
wherein the handle assembly further comprises an upper clamp member and a lower clamp member,
wherein the locking lever is rotatably connected to an actuator member,
wherein the actuator member has an end which engages the lower clamp member,
wherein movement of the locking lever from the horizontal position to the vertical position disengages the end of the actuator member from the lower clamp member, and
wherein the lower clamp member further comprises a protrusion configured to engage at least one detent of the hinge assembly.

10. The item of cookware according to claim 9, wherein the protrusion is configured to engage a first detent of the hinge assembly when the locking lever is in the substantially horizontal position and engage a second detent of the hinge assembly when the locking lever is in the substantially vertical position.

11. A nested arrangement of stacked cookware, comprising a plurality of cookware pieces comprising a receptacle and a handle assembly hingedly connected to the receptacle via a hinge assembly,
wherein the handle assembly comprises a locking lever and a handle grip portion,
wherein the locking lever is adapted to rotate independently of the handle grip portion from a substantially horizontal position, wherein the handle grip portion is locked in the substantially horizontal position, to a substantially vertical position, wherein the handle grip portion can rotate independently of the locking lever to the substantially vertical position, and
wherein the handle assembly further comprises an upper clamp member and a lower clamp member, and the upper clamp member and lower clamp member rotatably engage the hinge assembly.

12. The nested arrangement of stacked cookware according to claim 11, wherein the locking lever and the handle grip portion are in the substantially vertical position when the cookware is in the nested arrangement.

\* \* \* \* \*

UNITED STATES PATENT AND TRADEMARK OFFICE
CERTIFICATE OF CORRECTION

PATENT NO.         : 8,011,530 B2
APPLICATION NO.    : 11/715170
DATED              : September 6, 2011
INVENTOR(S)        : Duane B. Kutsch It is certified that error appears in the above-identified patent and that said Letters Patent is hereby corrected as shown below:

Column 5, Line 31, Claim 8, "position" should read -- position, --

Column 5, Line 32, Claim 8, "position" should read -- position, --

Column 5, Line 32, Claim 8, after "handle" insert -- grip --

Signed and Sealed this
Sixth Day of December, 2011

David J. Kappos
*Director of the United States Patent and Trademark Office*